United States Patent
Borhan et al.

(10) Patent No.: US 9,475,398 B2
(45) Date of Patent: Oct. 25, 2016

(54) OPTIMIZATION-BASED PREDICTIVE METHOD FOR BATTERY CHARGING

(71) Applicant: Cummins, Inc., Columbus, IN (US)

(72) Inventors: Hoseinali Borhan, Bloomington, IN (US); Joachim Kupe, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 134 days.

(21) Appl. No.: 14/273,065

(22) Filed: May 8, 2014

(65) Prior Publication Data

US 2015/0326037 A1 Nov. 12, 2015

(51) Int. Cl.
*H02J 7/04* (2006.01)
*H02J 7/00* (2006.01)
*G01R 31/36* (2006.01)
*B60L 11/18* (2006.01)

(52) U.S. Cl.
CPC .............. *B60L 11/18* (2013.01); *B60L 11/185* (2013.01); *B60L 11/1809* (2013.01); *H02J 7/00* (2013.01); *H02J 7/007* (2013.01); *H02J 7/0052* (2013.01); *Y02T 10/7011* (2013.01); *Y02T 10/7016* (2013.01)

(58) Field of Classification Search
CPC ... H02J 7/007; H02J 7/0052; B60L 11/1809; B60L 11/185
USPC .................................. 320/162, 132; 702/63
See application file for complete search history.

(56) References Cited

U.S. PATENT DOCUMENTS

| | | | |
|---|---|---|---|
| 6,285,162 B1 | 9/2001 | Koo | |
| 6,344,732 B2 | 2/2002 | Suzuki | |
| 7,360,615 B2 | 4/2008 | Salman et al. | |
| 7,518,340 B2 | 4/2009 | Sterz et al. | |
| 7,683,576 B2 * | 3/2010 | Tien | H02J 7/0019 320/128 |
| 7,737,662 B2 * | 6/2010 | Lu | H02J 7/0031 320/134 |
| 7,888,913 B1 | 2/2011 | Marty et al. | |
| 8,024,082 B2 | 9/2011 | Richter et al. | |
| 8,063,609 B2 | 11/2011 | Salasoo et al. | |
| 8,106,632 B2 | 1/2012 | Delaille et al. | |
| 8,148,950 B2 | 4/2012 | Matsuura et al. | |
| 2010/0123436 A1 | 5/2010 | Herrod et al. | |
| 2011/0156652 A1 | 6/2011 | Kishiyama et al. | |
| 2012/0098481 A1 | 4/2012 | Hunter et al. | |
| 2012/0133337 A1 | 5/2012 | Rombouts et al. | |
| 2014/0320090 A1 * | 10/2014 | Keeling | H02J 5/005 320/162 |
| 2015/0006008 A1 * | 1/2015 | Wei | H02J 7/007 701/22 |
| 2015/0066406 A1 * | 3/2015 | Sun | G01R 31/3679 702/63 |

OTHER PUBLICATIONS

Yan, J., et al., "Model Predictive Control-Based Fast Charging for Vehicular Batteries", Energies 2011, 4, 1178-1196; doi:10.3390/en4081178, 19 pages.
Bashash, S. et al., "Plug-in Hybrid Electric Vehicle Charge Pattern Optimization for Energy Cost and Battery Longevity", Journal of Power Sources 196, 2011, pp. 541-549.
Borhan, H. et al., "Control of Battery Storage for Wind Energy Systems," American Control Conference, 2012, pp. 1342-1349.
Klein, R. et al., "Optimal Charging Strategies in Lithium-Ion Battery", American Control Conference, 2011, pp. 382-387.
Liu, Y. et al., "Search for an Optimal Rapid-Charging Pattern for Li-Ion Batteries Using the Taguchi Approach", IEEE Transactions on Industrial Electronics, vol. 57, No. 12, Dec. 2010, pp. 3963-3971.
Maciejowski, J.M., *Predictive Control with Constraints*, Prentice Hall, 2002, 7 pages.
Shafiei, A. et al., "Plug-in Hybrid Electric Vehicle Charging: Current Issues and Future Challenges", IEEE Vehicle Power and Propolusion Conference, 2010, 8 pages.
Yan, J. et al., "Battery Fast Charging Strategy Based on Model Predictive Control", IEEE, 2010, 8 pages.

* cited by examiner

*Primary Examiner* — M'Baye Diao
(74) *Attorney, Agent, or Firm* — Foley & Lardner LLP (57) ABSTRACT

A battery management system for a rechargeable battery includes a battery monitor configured to acquire data regarding the rechargeable battery and a processor. The processor is configured to determine an initial state of charge of the battery based on the acquired data; determine a target state of charge for the battery; determine a plurality of charging solutions to achieve the target state of charge based on an optimization of one variable of the battery of a plurality of variables of the battery; narrow the plurality of charging solutions to charging solutions that meet an objective of each of the remaining plurality of variables of the battery; select the charging solution that corresponds with the fastest charge time for the battery from the charging solutions that meet the objective of each of the plurality of battery variables; and command a controller to regulate an amount of charge to the battery in accord with the selected charging solution.

22 Claims, 5 Drawing Sheets

OPTIMIZATION-BASED PREDICTIVE METHOD FOR BATTERY CHARGING

TECHNICAL FIELD

The present disclosure relates to battery management systems. More particularly, the present disclosure relates to charging systems and methods for batteries.

BACKGROUND

Batteries are widely used to provide electrical power. The type, size, and number of batteries can vary greatly based on the application. For example, a typical sedan automobile battery is a 12 volt rechargeable lead-acid type battery whereas a typical mobile phone battery is a rechargeable lithium-ion battery. Generally, the battery type can be classified as either non-rechargeable (i.e., primary) or rechargeable (i.e., secondary), where non-rechargeable batteries are batteries that are incapable of being recharged upon depletion of their energy.

In comparison, rechargeable batteries are capable of being recharged after depletion of their energy. Typically, the larger the battery the longer the time to recharge the battery. Accordingly, because of their size, electric and hybrid vehicles suffer from lengthy recharge times. The charge time is even more pronounced in heavy duty hybrid or electric vehicles, such as a front-end loader. As a result, various battery charging methods have been developed. For example, a conventional method to charge rechargeable batteries, specifically lithium-ion batteries, is the constant-current constant-voltage method. This method includes two steps. The battery is charged at a constant current (CC) until the battery voltage reaches a predefined upper voltage limit (first step), followed by a constant-voltage (CV) charging until the current reaches a predetermined small value (second step). However, CC-CV is not suitable for rapid charging because the constant current (CC) part may raise the battery temperature from the high charge rates, which may lead to a loss of battery life. Furthermore, the constant voltage (CV) part extends the charging time of the battery. Accordingly, the CC-CV method may increase charge times.

SUMMARY

One embodiment relates to a computer-readable storage medium having machine instructions stored therein, the instructions being executable by a processor to cause the processor to perform operations. The operations include determining an initial state of charge of a battery based on data acquired by a battery monitor; determining a target state of charge for the battery; determining a plurality of charging solutions to achieve the target state of charge based on optimization of one of a plurality of variables of the battery; narrowing the plurality of charging solutions to charging solutions that meet an objective of each of the remaining plurality of variables of the battery; selecting the charging solution that corresponds with the fastest charge time for the battery from the charging solutions that meet the objective of each of the plurality of battery variables; and commanding a controller to regulate an amount of charge to the battery in accord with the selected charging solution.

Another embodiment relates to a battery management system for a rechargeable battery, the system including a battery monitor configured to acquire data regarding the rechargeable battery and a processor. The processor is configured to determine an initial state of charge of the battery based on the acquired data; determine a target state of charge for the battery; determine a plurality of charging solutions to achieve the target state of charge based on an optimization of one of a plurality of variables of the battery; narrow the plurality of charging solutions to charging solutions that meet an objective of each of the remaining plurality of variables of the battery; select the charging solution that corresponds with the fastest charge time for the battery from the charging solutions that meet the objective of each of the plurality of battery variables; and command a controller to regulate an amount of charge to the battery in accord with the selected charging solution.

Still another embodiment relates to a vehicle including a battery management system configured to regulate recharging of a battery of the vehicle. The battery management system includes a battery monitor configured to acquire data regarding the battery and a processor coupled to the battery monitor. The processor is configured to determine an initial state of charge of the battery based on the acquired data; determine a target state of charge for the battery; determine a plurality of charging solutions to achieve the target state of charge based on an optimization of one of a plurality of variables of the battery; narrow the plurality of charging solutions to charging solutions that meet an objective of each of the remaining plurality of variables of the battery; select the charging solution that corresponds with the fastest charge time for the battery from the charging solutions that meet the objective of each of the plurality of battery variables; and command a controller to regulate an amount of charge to the battery in accord with the selected charging solution.

These and other features, together with the organization and manner of operation thereof, will become apparent from the following detailed description when taken in conjunction with the accompanying drawings.

DETAILED DESCRIPTION OF VARIOUS EMBODIMENTS

Referring to the figures generally, the various embodiments disclosed herein relate to systems and methods of charging a battery. More particularly, the present disclosure provides for a battery management system that utilizes an optimization-based predictive method to minimize the charge time of a battery while battery life is upheld. The optimization-based method utilizes two main stages. In the first stage, one battery variable is optimized (e.g., minimizing the energy lost during charging) within the constraints of the physical battery model (e.g., maximum operating temperature, maximum voltage, charge capacity, type, structure, etc.) over an optimization horizon to generate a family of charging solutions (i.e., to achieve a target state of charge from an initial state of charge for the battery). Rather than optimize a plurality of battery variables, only a single battery variable is optimized, with such optimization occurring over a finite period of time (i.e., the optimization horizon). Accordingly, in comparison to complex battery models that seek to optimize a plurality of variables, the optimization determination occurs relatively quickly such that the charging method may be implemented in real-time. In the second stage, the family of charging solutions are screened to identify the charging solution that meets the other constraints and/or objectives of the battery. Various battery models, equations, and/or principles (e.g., a battery voltage to state-of-charge relationship) may be utilized to screen the charging solutions in the second stage. For example, a battery life model may be utilized in the second stage that utilizes each of the family of charging solutions to determine which charging solution meets the objective battery life (e.g., a maximum battery life). After screening the family of charging solutions, the selected charging solution is the charging solution that charges the battery to the target state of charge the fastest while also meeting the screening objectives.

Referring more particularly to the method, the method may be implemented within the framework of model predictive controls ("MPC"). In MPC, a cost function is minimized (i.e., the optimization performed in stage one) and the obtained optimal input is applied until the next sampling instant, where the method is repeated again. Due to the real-time control characteristic of MPC, the MPC framework is well suited for receiving system inputs based on selected charging solutions and continuously adapting the charging solution to meet the changing and fixed system constraints. Moreover, because of the decreased computation time requirements with the method (due to optimizing only one variable in the first stage, rather than a plurality of battery variables), a high level of modularity of the method is obtained. As such, the method can accommodate various optimization models in the first stage, as well as various battery models in the second stage (e.g., battery life model). Thus, the method may be implemented in a vast array of battery systems.

As used herein, the phrase "state of charge" refers to the charge level of the battery (i.e., a current battery capacity versus the maximum battery capacity, usually expressed as a percentage). As also used herein, "battery capacity" refers to the amount of charge a battery can deliver for a specific amount of time (expressed in ampere-hours). For example, a 100 ampere-hours capacity refers to a battery that can deliver 5 amperes for 20 hours (5 amperes*20 hours=100 ampere-hours). As also used herein, the phrase "energy loss (or lost) during charging" refers to the amount of energy lost while the battery is charging. For example, while a power source is delivering a charge to a battery, in addition to receiving the charge, the battery also acts as a resistor. As such, some of the charge may be "lost" to heat generated by the charge interacting with the battery (resistance part). Furthermore, "energy lost" also includes any charge that is lost (e.g., dissipated as heat) over transmission lines in the charging circuitry (e.g., the conductive material that transmits the charge from the power source to the battery has an internal resistance that absorbs some of the charge while transmitting it to the battery). As also used herein, the phrase "battery life" refers to at least one of a shelf life of a battery (i.e., how long a battery can remain inactive before not satisfying specific performance criteria) and a cycle life of a battery (i.e., how many charge-discharge cycles a battery can endure before not satisfying specific performance criteria). Specific performance criteria may include any predefined acceptable operating range for the battery. For example, a battery that is only capable of 75 ampere-hours from its original 100 ampere-hours may be deemed to not meet the minimum performance criteria of 80 ampere-hours. The acceptable performance criteria may be defined in regard to other variables and/or characteristics of the battery as well. Also, as used herein, the phrase "state of health" ("SOH") refers to the current battery capacity of the battery. Whereas SOC refers to the current level of charge in the battery, the SOH refers to the amount of charge a battery can hold (typically, expressed as a percentage in relation to an original amount of charge capacity of the battery). Finally, as used herein, the phrase "charging solution" refers to the amount of charge (at constant or varying voltage) provided to the battery for charging for a given amount of time (e.g., ten amperes for five seconds followed by 4 amperes for fifteen minutes).

Figure 1:
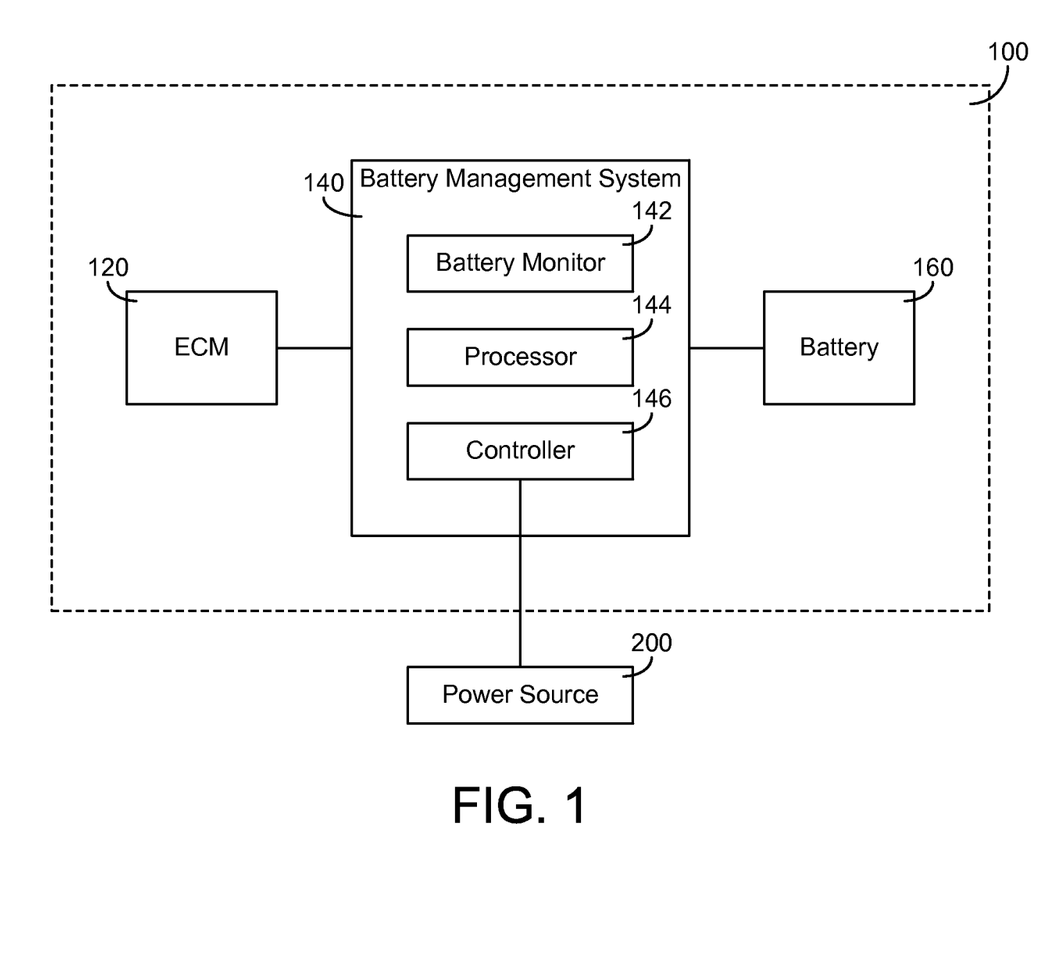
FIG. 1 is a schematic view of a vehicle with a battery management system according to an exemplary embodiment.

Referring now to FIG. 1, a vehicle 100 is shown with an electronic control module ("ECM") 120, a battery management system 140, and a battery 160. For ease of explaining, other vehicle components (e.g., an internal combustion engine) are omitted in the Figure. The ECM 120 may be coupled to one or more sensors that monitor the operation of the vehicle 100 to detect various operating conditions of the vehicle (e.g., tire air pressure). The ECM 120 may include various other vehicle control systems (e.g., an on-board diagnostic system, a powertrain control module, a transmission control unit, etc.).

The vehicle 100 includes hybrid vehicles (a combination of an internal combustion engine with a battery that powers the vehicle) and/or full electric vehicles (the vehicle is completely battery powered). The vehicle 100 may also include various types of hybrid and electric vehicles, such as light duty vehicles (e.g., a sedan, golf cart, wheel chair, forklift) and heavy-duty vehicles (e.g., a front-end loader). Based on the type of the vehicle 100, a wide range of battery(ies) 160 may be utilized with the vehicle 100. In order to meet the power requirements of the vehicle 100, more than one battery 160 may be coupled together (e.g., in series) to increase the available voltage (and power) from the batteries. According to one embodiment, the battery 160 includes a secondary (rechargeable) lithium-ion battery. According to various other embodiments, the battery 160 may include any rechargeable lead-acid, lithium-polymer, and/or nickel metal hydride (NiMH) battery. Because the battery 160 is rechargeable, as shown in the example in FIG. 1, a power source 200 may be utilized to recharge the battery 160 of the vehicle. As such, the power source 200 may include a wall outlet (120 volts of alternating current, or any other voltage), or any other type of power source capable of recharging the battery 160. In some embodiments, the power source 200 may be an on-board (i.e., included with the vehicle) generator in the vehicle 100 rather than an external supply of power as shown in the example in FIG. 1.

As shown in the example in FIG. 1, the battery management system 140 is coupled to both the battery 160 and the ECM 120 of the vehicle 100. The battery management system 140 is shown to include a battery monitor 142, a processor 144, and a controller 146. The controller 146 regulates the charge (i.e., current) from the power source 200 to implement the selected charging solution with the battery 160. The battery monitor 142 acquires data regarding the battery 160. The data may include a temperature of the battery, a current into or out of the battery, a number of charge-discharge cycles, a battery voltage, etc. As such, the battery monitor 142 may include one or more sensors coupled to the battery 160 that acquire such data. The sensors may include voltage sensors, current sensors, temperature sensors, etc. The battery monitor 142 provides the acquired data to the processor 144 of the battery management system 140. In the example of FIG. 1, the battery management system 140 is separate from the battery 160 and the ECM 120. However, in some embodiments, the functions described herein in regard to the battery management system 140 (particularly, processor 144) may be performed by one or more existing processors in the ECM 120. Moreover, the controller 146 may also be included with the ECM 120 such that, in this embodiment, the ECM regulates the charge from the power source 200 to the battery 160.

The processor 144 may be implemented as a general-purpose processor, an application specific integrated circuit (ASIC), one or more field programmable gate arrays (FPGAs), a digital signal processor (DSP), a group of processing components, or other suitable electronic processing components. The battery management system 140 may also include one or more memory devices. The memory may be one or more devices (e.g., RAM, ROM, Flash Memory, hard disk storage, etc.) for storing data and/or computer code for facilitating the various processes described herein. The memory device may be or include non-transient volatile memory or non-volatile memory. The memory device may include database components, object code components, script components, or any other type of information structure for supporting the various activities and information structures described herein. The memory device may be communicably connected to processor 144 and provide computer code or instructions to the processor 144 for executing the processes described in regard to the battery management system 140 herein.

Figure 2:
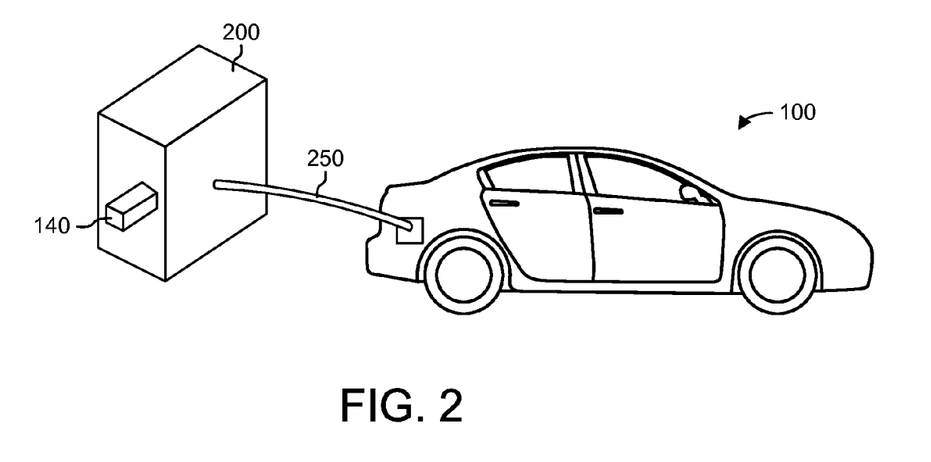
FIG. 2 is an isometric view of a power source with a battery management system that is coupled to an electric or hybrid vehicle, according to an exemplary embodiment.
Figure 3:
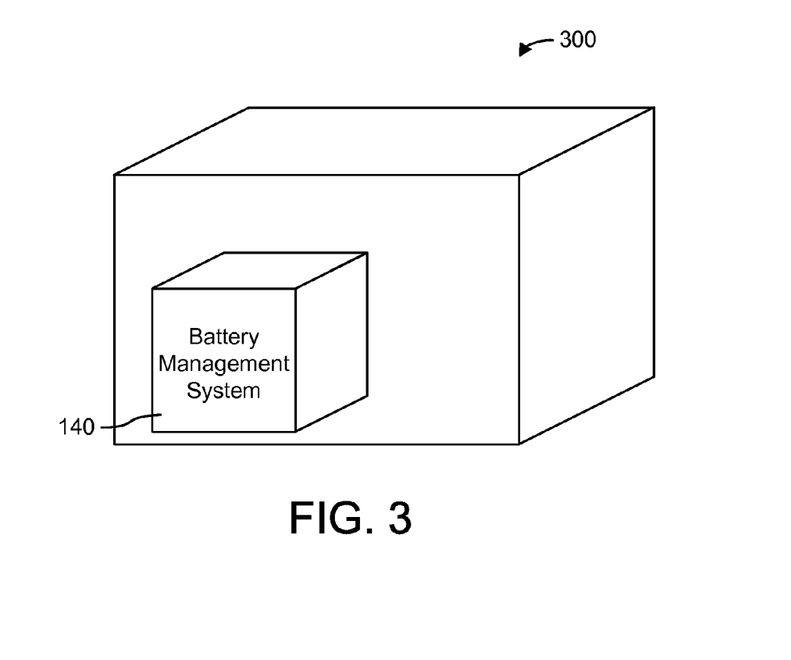
FIG. 3 is an isometric view of a stationary application for a rechargeable battery with a battery management system according to an exemplary embodiment.
Figure 4:
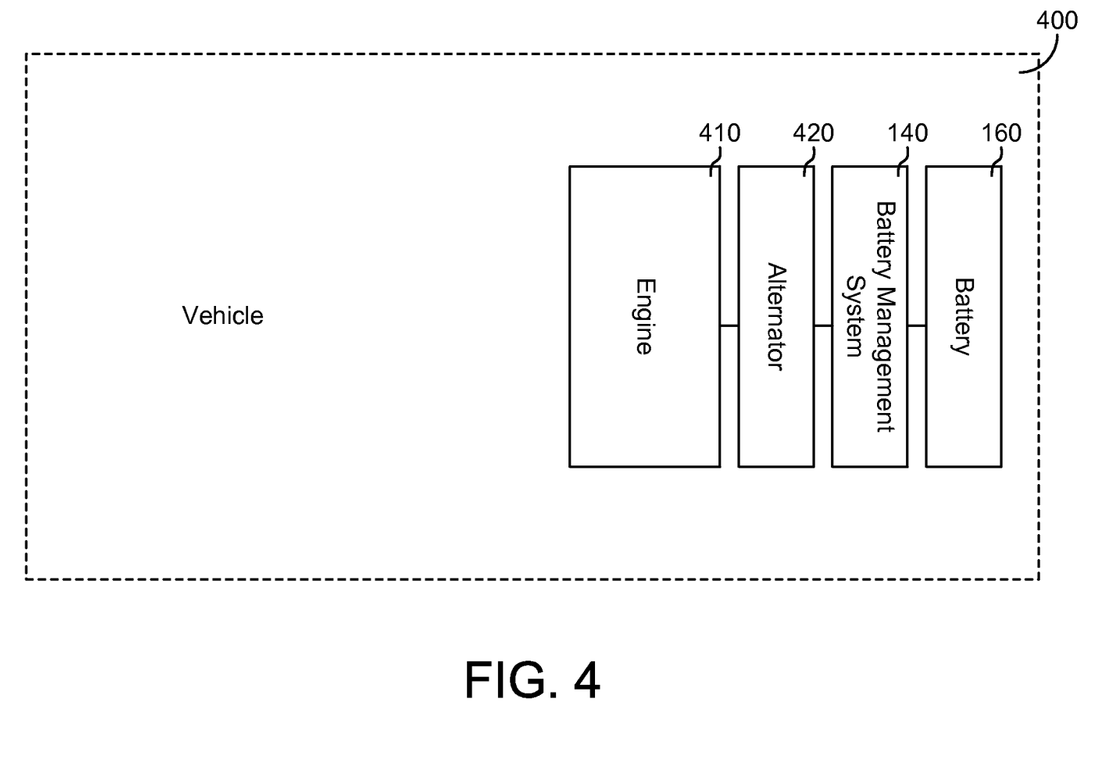
FIG. 4 is a schematic view of a vehicle with a battery management system according to an exemplary embodiment.

Before the functions of the battery management system 140 are described (in relation to FIG. 5 herein), various other embodiments of the system 140 are shown in FIGS. 2-4. In FIG. 2, the battery management system 140 is embodied within the power source 200. In this embodiment, the ECM 120 provides data regarding one or more batteries 160 of the vehicle 100 to the system 140 via a charging connection 250. Thus, the battery management system 140 (via controller 146) regulates the amount of charge delivered to the battery 160 at the power source 200 directly and not upon reception of the charge within the vehicle 100. The charging connection 250 may be any typical wired connector that enables the transfer of charge and data from the power source 200 (and battery management system 140) to the battery 160 or batteries and vice versa. In another embodiment, the charging connection 250 may include any wireless connection that enables the transfer of charge and data, such as induction pads.

In the example in FIG. 3, the battery management system 140 is utilized within a stationary object 300 with rechargeable (secondary) type batteries. The stationary object 300 may include a generator, a battery bank for data centers, etc. In the stationary embodiment, the power source 200 may include the combustion of a fossil fuel (e.g., an internal combustion engine) that generates electricity which is provided to the battery 160 via system 140. Finally, FIG. 4 depicts a non-hybrid or electric, internal combustion engine vehicle 400. The vehicle 400 includes an internal combustion engine 410 coupled to an alternator 420, which is coupled to a battery 160. In this embodiment, the battery 160 may include a 12 volt lead-acid type automotive battery. As the internal combustion engine 410 is operating, an alternator belt drives the alternator 420. The alternator 420 generates alternating current, which is rectified to direct current via one or more diodes (typically, in the alternator 420) before being supplied to the battery 160 for charging. As shown, the battery management system 140 is located between the alternator 420 and the battery 160. Accordingly, the battery management system 140 regulates the amount of charge from the alternator 420 to the battery 160 in order to allow efficient, safe, and fast charging of the battery 160 (in accord with the method disclosed herein).

Figure 5:
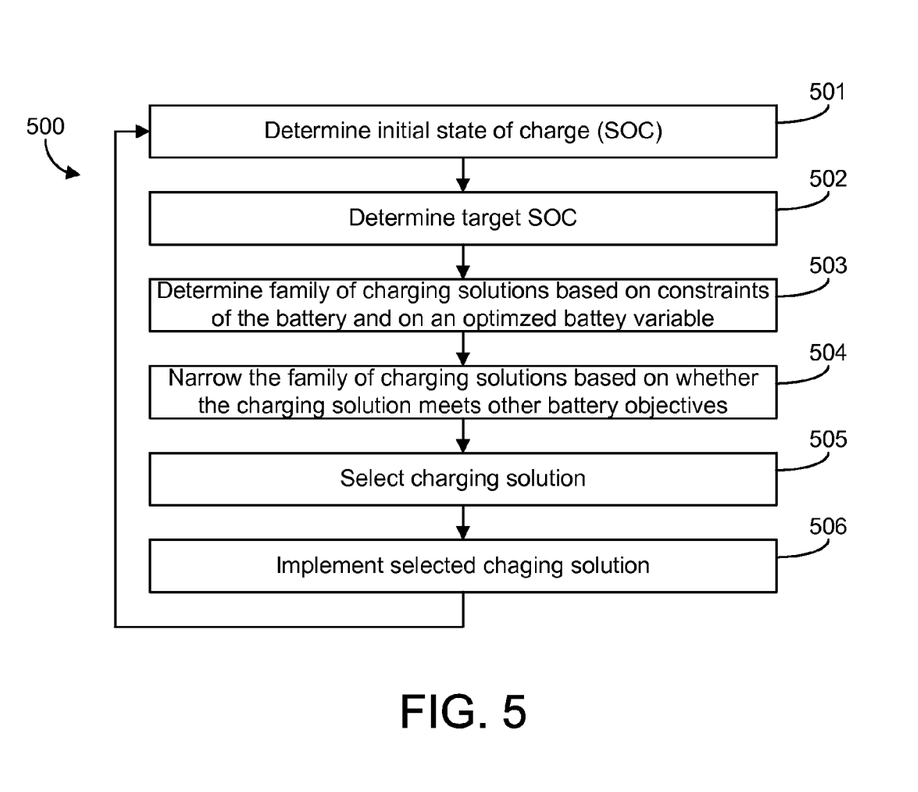
FIG. 5 is a flowchart of a method of charging a battery according to an exemplary embodiment.

Referring now to FIG. 5, a method 500 of fast-charging a battery based on a predictive optimization strategy is shown according to one embodiment. In certain embodiments, method 500 is implemented with the battery management system 140 described herein. Accordingly, method 500 is applicable with the various embodiments shown in FIGS. 1-4. For example, method 500 may be embodied as machine-readable instructions that are executable by a processor 144 of the system 140 (in an alternate embodiment, by one or more processors of the ECM 120).

Method 500 begins with the determination of an initial state-of-charge ("SOC") of the battery (501). The SOC may be determined by the battery management system 140 via data acquired by the battery monitor 142. In other embodiments, the SOC may be determined via SOC models and/or mathematical estimations that are stored in one or more memory devices of the system 140 (in the alternative, in the ECM 120). As an example, the battery monitor 142 may acquire the voltage across the battery as the battery is discharged and combine this voltage data with a known-relationship of voltage-to-SOC for that battery to determine the SOC for the battery at a particular time. Another example of determining SOC includes measuring the current into and out of the battery (i.e., "coulomb counting"). Based on the starting current and net current out, the (estimated or determined) remaining amount of current may represent the SOC. Accordingly, the SOC may be determined by any one or a combination of at least the following methods: coulomb counting, a voltage measurement method (e.g., open-circuit voltage method (i.e., no load applied) and terminal voltage method (i.e., the battery is connected to a load)), and/or other various mathematical methods or model-based methods.

After determination of the initial SOC, a target SOC is determined (502). The target SOC refers to the level of charge that the battery will be (is intended to be) charged to. For example, the target SOC may be 85%. Accordingly, if the initial SOC is at 25%, the charge from the power source will be delivered until the SOC is at least 85%. The target SOC may be predefined with the system 140 and/or adjustable based on the desire of a user.

Figure 6:
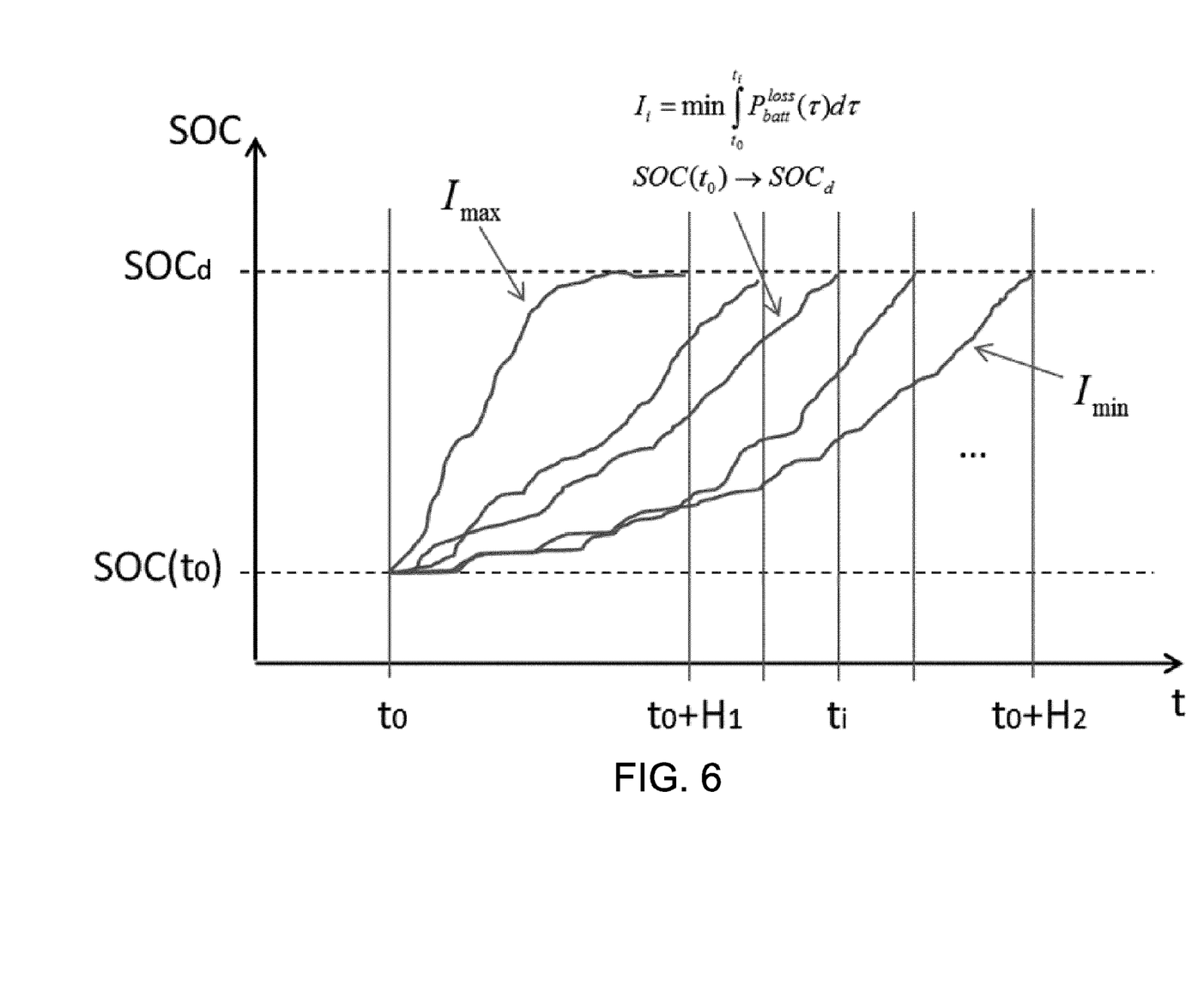
FIG. 6 is a graph of charging solutions generated in the method of FIG. 5 according to an exemplary embodiment.

Using the initial SOC and the target SOC, the battery management system 140 determines a family of charging solutions within the physical constraints of the battery based on an optimized variable of the battery (503). The battery variables include an amount of energy lost during charging of the battery, a charge time for the battery, an amount of life of the battery, and a state of health of the battery. Accordingly, the optimization of the battery variables includes one of minimizing the energy loss during charging, minimizing the loss of battery life, maximizing the state of health of the battery, and minimizing the charge time. In other embodiments, the battery variables listed above may be different, the same, greater than, or less than those listed above (e.g., include battery temperature). Accordingly, the battery variable to be optimized and the remaining battery variables used to screen the charging solutions (operation 504 below) may vary. The physical constraints of the battery include the battery type (lithium-ion), the battery electrical characteristics (e.g., a 14 volt maximum capacity, limits on deliverable current due to the battery based on the wiring and/or the battery), and the physical characteristics of the battery (e.g., length of the cell, length of the electrolyte section within the cell, amount of electrolyte, size of cathode and anode, etc.). As mentioned above, only one battery variable is optimized to produce the family of charging solutions. Thus, the computation requirement is relatively less complex than if all the battery variables were optimized within the constraints of the physical battery. The optimization may be based on mathematical estimates, battery models, etc. (e.g., a battery life model). Referring to FIG. 6, a family of charging solutions is shown according to an example embodiment. The solutions are parameterized by a given charge time at the end of an optimization horizon. As mentioned above, because the battery management system 140 is only optimizing one variable, the family of charging solutions may be generated shortly due to the reduced order optimization problem. In the example of FIG. 6, the battery management system 140 minimized the energy lost during charging (i.e., variable optimized).

After the family of charging solutions is generated, the family of charging solutions is narrowed based on whether the charging solution, if implemented, would meet or substantially meet various other battery objectives (504). For example, if the battery variable optimized is energy lost during charging. In some embodiments then, the remaining battery variables include a charge time for the battery, an amount of life of the battery, and a state of health of the battery. Accordingly, various models or principles for each of the remaining variables may be utilized with each charging solution to determine how each particular charging solution would impact that variable. If the charging solution would cause or likely cause the variable to not meet or substantially meet various criteria, then that charging solution is eliminated. For example, the maximum current charging solution may correspond with the shortest charge time, but the battery management system 140 eliminates it because the high amount of current would increase the likelihood of a combustible event by 50%, which is greater than the predefined acceptable level of 25%. In another example, a high charge current rate may correspond with a short charge time to a target SOC, however, the high charge rate adversely impacts the battery life by a greater than acceptable amount, such that that charging solution is also eliminated. Accordingly, the battery management system 140 eliminates the charging solutions that do not meet or substantially meet the other objectives for the battery (504).

Based on the above, the battery management system 140 selects the charging solution that meets or substantially meets all the criteria ("objectives") of the remaining battery variables (505). If there is more than one charging solution, the battery management system 140 selects the charging solution that charges the battery to the target SOC the fastest. Accordingly, utilizing method 500, the battery management system 140 ensures that the battery is charged as fast as possible within the constraints of the physical battery model and while meeting various other objectives (e.g., battery life) for the battery. In other embodiments, a different tie break criteria may be utilized by the battery management system 140 (e.g., selecting the charging solution that corresponds with the least amount of loss of battery life rather than just charge time).

After selection of the charging solution, the battery management system 140 implements the chosen charging solution with the battery (506). In one embodiment, the battery management system 140 commands the controller 146 to regulate the amount of charge going to the battery in accord with the selected charging solution. Method 500 may be run continuously such that charging solutions may be determined and implemented in real-time. In sum, among the other steps, method 500 includes the optimization of a battery variable to generate potential charging solutions and the elimination of the charging solutions that do not meet other objectives for the rechargeable battery.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The present disclosure contemplates methods, systems, and program products on any machine-readable media for accomplishing various operations. As mentioned above, in certain embodiments, the battery management system forms a processing system or subsystem (e.g., of vehicle 100 or charging station 300) including one or more computing devices having memory, processing, and communication hardware. The functions of the system may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the system includes one or more modules structured to functionally execute the operations of the system (e.g., processor 144). The description herein including the components of the system emphasizes the structural independence of the aspects of the system, and illustrates one grouping of operations and responsibilities of the system. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of the operations of the system are included in the section referencing FIG. 5.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including an electrical actuator, a solenoid, an op-amp, analog control elements (springs, filters, integrators, adders, dividers, gain elements), and/or digital control elements.

What is claimed is:

1. A non-transitory computer-readable storage medium having machine instructions stored therein, the instructions being executable by a processor to cause the processor to perform operations comprising:
   determining, by the processor, an initial state of charge of a battery based on data acquired by a battery monitor;
   determining, by the processor, a target state of charge for the battery;
   determining a plurality of charging solutions to achieve the target state of charge based on an optimization of one of a plurality of variables of the battery;
   narrowing, by the processor, the plurality of charging solutions to charging solutions that meet an objective of each of the remaining plurality of variables of the battery;
   selecting, by the processor, the charging solution that meets the objective of each of the remaining plurality of variables; and
   regulating, by the processor, an amount of charge to the battery in accord with the selected charging solution.

2. The medium of claim 1, wherein the battery is at least one of a lithium-ion, lead-acid, and nickel-metal-hydride rechargeable battery.

3. The medium of claim 1, wherein the plurality of variables includes at least one of an amount of energy lost during charging of the battery, a charge time for the battery, an amount of life of the battery, and a state of health of the battery.

4. The medium of claim 1, wherein the optimization of the one variable includes one of minimizing an amount of energy lost during charging of the battery, minimizing a charge time for the battery, maximizing an amount of life of the battery, and maximizing a state of health of the battery.

5. The medium of claim 1, wherein the determination of a plurality of charging solutions to achieve the target state of charge based on the optimization of the one variable is determined within a physical constraint of the battery.

6. The medium of claim 5, wherein the physical constraint of the battery includes at least one of a maximum operating temperature, a maximum voltage, and a maximum current.

7. The medium of claim 1, wherein the objective of each of the remaining plurality of variables of the battery includes at least one of a predefined minimum amount of energy lost during charging of the battery, a minimum charge time for the battery, a minimum amount of life of the battery, and a minimum state of health of the battery.

8. A battery management system for a rechargeable battery, the system comprising:
   a battery monitor configured to acquire data regarding a rechargeable battery; and
   a processor coupled to the battery monitor and configured to:
      determine an initial state of charge of the battery based on the acquired data;
      determine a target state of charge for the battery;
      determine a plurality of charging solutions to achieve the target state of charge based on an optimization of one of a plurality of variables of the battery;
      narrow the plurality of charging solutions to charging solutions that meet an objective of each of the remaining plurality of variables of the battery;
      select the charging solution that meets the objective of each of the plurality of variables of the battery; and
      regulate an amount of charge to the battery in accord with the selected charging solution.

9. The system of claim 8, wherein the rechargeable battery is at least one of a lithium-ion, lead-acid, and nickel-metal-hydride battery.

10. The system of claim 8, wherein the plurality of variables includes at least one of an amount of energy lost during charging of the battery, a charge time for the battery, an amount of life of the battery, and a state of health of the battery.

11. The system of claim 8, wherein the optimization of the one variable includes one of minimizing an amount of energy lost during charging of the battery, minimizing a charge time for the battery, maximizing an amount of life of the battery, and maximizing a state of health of the battery.

12. The system of claim 8, wherein the determination of a plurality of charging solutions to achieve the target state of charge based on the optimization of the one variable is determined within a physical constraint of the battery.

13. The system of claim 12, wherein the physical constraint of the battery includes at least one of a maximum operating temperature, a maximum voltage, and a maximum current.

14. The system of claim 8, wherein the objective of each of the remaining plurality of variables of the battery includes at least one of a predefined minimum amount of energy lost during charging of the battery, a minimum amount of charge time for the battery, a minimum amount of life of the battery, and a minimum state of health of the battery.

15. A vehicle comprising:
   a battery management system configured to regulate recharging of a battery of the vehicle, the battery management system including:
      a battery monitor configured to acquire data regarding the battery; and
      a processor coupled to the battery monitor and configured to:
         determine an initial state of charge of the battery based on the acquired data;
         determine a target state of charge for the battery;
         determine a plurality of charging solutions to achieve the target state of charge based on an optimization of one variable of the battery of a plurality of variables of the battery;
         narrow the plurality of charging solutions to charging solutions that meet an objective of each of the remaining plurality of variables of the battery;
         select the charging solution that meets the objective of each of the plurality of variables of the battery; and
         regulate an amount of charge to the battery in accord with the selected charging solution.

16. The vehicle of claim 15, wherein the battery is at least one of a lithium-ion, lead-acid, and nickel-metal-hydride battery.

17. The vehicle of claim 15, wherein the vehicle is at least one of a hybrid and full electric vehicle.

18. The vehicle of claim 15, wherein the plurality of variables includes at least one of an amount of energy lost during charging of the battery, a charge time for the battery, an amount of life of the battery, and a state of health of the battery.

19. The vehicle of claim 15, wherein the optimization of the one variable includes one of minimizing the amount of energy lost during charging of the battery, minimizing the charge time for the battery, maximizing the amount of life of the battery, and maximizing the state of health of the battery.

20. The vehicle of claim 15, wherein the determination of a plurality of charging solutions to achieve the target state of charge based on the optimization of the one variable is determined within a physical constraint of the battery.

21. The vehicle of claim 20, wherein the physical constraint of the battery includes at least one of a maximum operating temperature, a maximum voltage, and a maximum current.

22. The vehicle of claim 15, wherein the objective of each of the remaining plurality of variables of the battery includes at least one of a predefined minimum amount of energy lost during charging of the battery, a minimum charge time for the battery, a minimum amount of life of the battery, and a minimum state of health of the battery.

* * * * *